(12) United States Patent
Knook

(10) Patent No.: US 10,858,207 B2
(45) Date of Patent: Dec. 8, 2020

(54) APPARATUS FOR UNSTACKING PACKAGING UNITS

(71) Applicant: MOBA GROUP B.V., Barneveld (NL)

(72) Inventor: Arie Jan Theodorus Knook, Barneveld (NL)

(73) Assignee: MOBA GROUP B.V., Barneveld (NL)

( * ) Notice: Subject to any disclaimer, the term of this patent is extended or adjusted under 35 U.S.C. 154(b) by 0 days.

(21) Appl. No.: 15/567,487

(22) PCT Filed: Apr. 25, 2016

(86) PCT No.: PCT/NL2016/050289
§ 371 (c)(1),
(2) Date: Oct. 18, 2017

(87) PCT Pub. No.: WO2016/171561
PCT Pub. Date: Oct. 27, 2016

(65) Prior Publication Data
US 2018/0105379 A1    Apr. 19, 2018

(30) Foreign Application Priority Data

Apr. 24, 2015 (EP) .................................... 15001229

(51) Int. Cl.
*B65H 3/08* (2006.01)
*B65G 59/06* (2006.01)
*B65G 59/10* (2006.01)

(52) U.S. Cl.
CPC ......... *B65H 3/0883* (2013.01); *B65G 59/062* (2013.01); *B65G 59/106* (2013.01);
(Continued)

(58) Field of Classification Search
CPC ................ B65G 59/106; B65G 59/062; B65G 2201/0258; B65G 59/06; B65H 3/0883; B65H 2801/81; B65H 2701/12
(Continued)

(56) References Cited

U.S. PATENT DOCUMENTS 3,275,189 A * 9/1966 Goldsborough ........ B65B 43/44
221/36
3,401,831 A * 9/1968 Saurenmann ........ B65G 59/106
221/211
(Continued)

FOREIGN PATENT DOCUMENTS

EP    1 275 604    1/2003
FR    2 736 904    1/1997
(Continued)

OTHER PUBLICATIONS

International Search Report, International Application No. PCT/NL2016/050289, International Filing Date: Apr. 25, 2016, 4 pages.

*Primary Examiner* — Lynn E Schwenning
(74) *Attorney, Agent, or Firm* — Marvin Petry; Stites & Harbison PLLC

(57) ABSTRACT

This invention relates to an apparatus and a method for unstacking preformed products (2), for example packaging units, stacked in a stack, these products comprising for example planar parts (4) and projecting parts (3) which are all stacked onto and into each other in line, wherein the method comprises, —placing a gripper with at least a single suction cup unit (51) of flexible material, more particularly a suction mouth thereof, on a planar product part (4) of such a product, —suction-engaging such a product, —conveying the product to a delivery location, and—releasing the product, wherein upon suction the planar product part (4) is pulled against a plate (55) which is part of the apparatus. It has been found that in this way in a suitable manner stacks (Continued)

Figure 1:
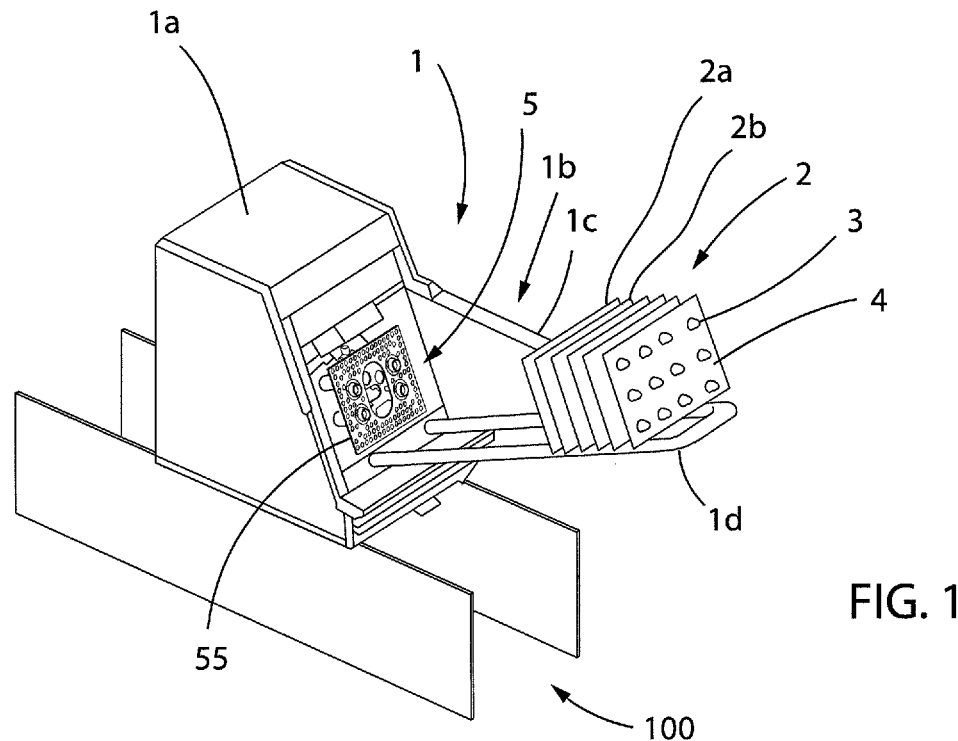

of flexible and thin-walled packaging units can be unstacked, without the stack being disturbed or the packaging unit taken off being damaged or being picked up in the wrong position.

8 Claims, 1 Drawing Sheet

(52) U.S. Cl.
CPC ...... *B65G 59/06* (2013.01); *B65G 2201/0258* (2013.01); *B65H 2701/12* (2013.01); *B65H 2801/81* (2013.01)

(58) Field of Classification Search
USPC .......................................... 414/795.6, 797.8
See application file for complete search history.

(56) References Cited

U.S. PATENT DOCUMENTS

| | | | | |
|---|---|---|---|---|
| 3,511,395 A * | 5/1970 | Brown, Jr. | ............... | B65B 41/06 221/262 |
| 3,606,960 A * | 9/1971 | Butterworth | ............ | B65B 43/44 221/211 |
| 3,907,161 A * | 9/1975 | Martin | .................... | B65B 43/44 221/211 |
| 3,952,635 A * | 4/1976 | Mims | ..................... | B31B 50/00 493/180 |
| 4,109,803 A * | 8/1978 | Quelch | ................ | B65G 59/106 221/211 |
| 4,305,691 A * | 12/1981 | Mayer | .................. | B65G 59/106 221/211 |
| 4,322,067 A * | 3/1982 | Masselin | .............. | B65H 3/0883 221/211 |
| 4,674,935 A * | 6/1987 | Feliks | ................... | B65B 43/185 198/468.4 |
| 4,674,998 A * | 6/1987 | Benedicenti | ............ | B31B 50/00 493/164 |
| 5,064,183 A * | 11/1991 | Nishigaki | ............ | B65H 3/0833 271/107 |
| 5,127,207 A * | 7/1992 | Cunningham | ........ | B65B 43/185 271/102 |
| 5,133,169 A * | 7/1992 | Tesch, Jr. | ................ | B65B 5/068 53/247 |
| 5,807,065 A * | 9/1998 | Kuhl | .................... | B65G 47/912 414/752.1 |
| 5,876,180 A * | 3/1999 | Sims | .................... | B65G 59/106 221/210 |
| 2007/0104564 A1* | 5/2007 | Covarrubias | ........ | B65G 59/106 414/795.4 |
| 2011/0121590 A1* | 5/2011 | Schaaf | ................ | B25J 15/0616 |
| 2012/0121372 A1 | 5/2012 | Raque et al. | | |
| 2017/0036247 A1* | 2/2017 | Hoshikawa | ............... | B08B 3/02 |
| 2017/0225323 A1* | 8/2017 | Barber | .................. | B25J 9/0012 |

FOREIGN PATENT DOCUMENTS

| | | | | |
|---|---|---|---|---|
| FR | 2736904 | * | 1/1997 | ............ B65B 43/44 |
| GB | 2 199 559 | | 7/1988 | |

* cited by examiner

APPARATUS FOR UNSTACKING PACKAGING UNITS

The present invention relates to an apparatus for unstacking preformed products, for example packaging units, stacked in a stack, these products comprising planar parts and projecting parts which are all stacked onto and into each other in line. Such an apparatus is also referred to as a denester and is described in more detail in the preamble of claim 1. The apparatus comprises a gripper with at least a single suction cup unit of flexible material for suction-engaging, from the stack, a single product at a planar product part thereof, wherein the suction cup unit comprises a suction cup mouth with an opening surface which upon the engaging mentioned is substantially parallel to the planar product part, wherein the suction cup unit is connected with a suction tube which extends in a direction substantially perpendicular to the opening surface. The suction tube is for instance connected to an operable suction device (for example, an air pump).

Further, the invention comprises a method for applying the apparatus mentioned, as described in the preamble of claim 5.

More particularly, the packaging units are packaging units for food products, for example trays or boxes, in which the positions for these products can often be regarded as nests, reflecting especially the shape of these products. Such packaging units are of paperboard, pulp, or plastic, and hence flexible, especially intended to not damage such products, for example eggs, fruits, or tomatoes. In the art of manufacturing such packaging units, it is customary to form them such that a minimum of material will suffice, that is, without additional corner parts, unnecessary supporting parts, unnecessary cover parts, and especially as thin-walled as possible.

To one skilled in the art it will be clear that such boxes can consist of box halves, a bottom with a cover, and therefore comprise a fold.

When unstacking such a stack of thin-walled units, disengaging units from each other will, due to their highly flexible character, actually generate friction because the projections of these packaging units are not pulled off each other in the right direction to a sufficient degree.

Many examples of such apparatuses have been used and described.

In U.S. Pat. No. 3,907,161, for example, a suction gripper apparatus is described for unstacking trays, where a gripper has a profile that corresponds to that of the tray, and where via suction holes at the location of the more horizontal parts of the gripper, suction and blowing can be applied at will.

GB2199559 describes a destacker with a suction area profile that closely fits that of the products to be engaged and unstacked.

In US2012121372 there are described for such a denester, in particular, the manner of supply of products such as trays, and the pick-up and transfer of such a tray to a conveyor.

These examples all concern ways of gripping whereby, in addition to the suction, a profile is utilized that closely fits the specific profile of the respective products to be engaged.

It is well known to utilize a system of, for example one or two or several, suction cups to pick up, for example, blanks or intermediate boards, mostly of cardboard, and to convey them to an intended location.

It has been found that such a simple system of suction cups nonetheless sometimes does not yield the desired result for the purpose of treating the thin-walled and flexible products involved here.

For instance, as a result of a stack being a little askew, or off plumb, or as a result of the position of the suction cups not being placed on a planar part equally accurately everywhere, or as a result of the mutual distance settings of the suction mouth opening differing slightly, for instance because they have been displaced a fraction as a result of vibrations or being pushed, or for still other reasons, such products or packaging units will still be susceptible of suction being applied askew and being engaged askew, with consequences as already mentioned hereinabove.

To remedy such a deficiency, the apparatus according to the present invention is characterized in that the apparatus furthermore comprises a planar plate, with passage opening for the suction tube and being substantially perpendicular to the above-mentioned perpendicular direction (of the suction tube), the configuration being such that upon the engaging mentioned the (in particular planar) product part is pulled against the plate.

With great advantage, the properties of a suction cup are combined with a plate which at the right time and in the right position provides support in the engaging of such flexible products. To put it differently, where previously two hands of an operator were needed to grasp such a packaging unit from a stack, this can now be carried out in a suitable manner with such a combination.

It has furthermore been found that, in a suitable manner, stacks of flexible and thin-walled packaging units can be unstacked without disturbing the stack or damaging the packaging unit taken off, or picking it up in the wrong position/orientation.

Further advantageous features are defined in subclaims.

To be mentioned as corresponding advantages thereof, by way of example but not exclusively, are the possibility of adjustment and adaptation to different types of packaging units and suction cups, and preventing wear of the suction cups through an appropriate choice of the size and shape of the passage openings.

As indicated above, the invention also comprises a method. An aspect concerns a method for unstacking preformed products, for example packaging units, stacked in a stack, these products comprising for example planar parts and projecting parts which are all stacked onto and into each other in line, wherein the method comprises:

placing a gripper with at least a single suction cup unit of flexible material, more particularly a suction mouth thereof, on a planar product part of such a product, suction-engaging such a product, conveying the product to a delivery location, and releasing the product, wherein the method is characterized in that upon suction the planar product part is pulled against a plate.

In a highly suitable manner, in engaging planar product parts against the plate, damaging of such a product as well as shifting of the product and hence delivering it incorrectly positioned, are obviated. The method can for instance comprise the use of an apparatus according to the invention.

Further features according to the method are defined in the subclaims.

Figure 2:
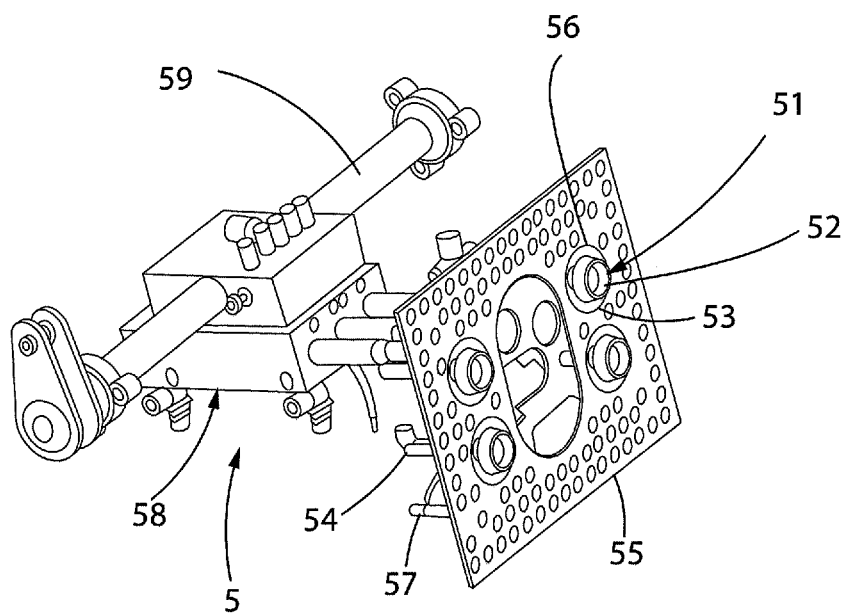

Details of an example of an apparatus according to the present invention will be described and elucidated with reference to a drawing, in which FIG. 1 shows a general isometric view of an exemplary embodiment of a denester according to the present invention, and FIG. 2 shows a detail of the apparatus according to FIG. 1.

In the different FIGURES the same numerals and designations denote the same parts.

FIGS. 1 and 2 show a non-limiting example of an apparatus/denester 1 for unstacking preformed products 2a, 2b, . . . , for example packaging units, stacked in a stack 2. The products comprise planar parts 4, having thereon projecting parts 3. The apparatus 1 includes a plurality of suction cup units 51 for engaging a frontmost product of the stack, at a planar product part thereof. Each suction cup unit 51 is provided with a respective suction tube 54 which extends in a suction tube direction (namely, a direction which is substantially perpendicular to a suction cup opening surface 53). With great advantage, the apparatus 1 comprises furthermore a planar plate, with passage openings 56 for the suction tubes and/or suction cup units 51. The plate 55 is substantially perpendicular to the suction tube direction (i.e., is parallel to the suction cup opening surfaces 53 of the suction cups). The configuration is such that, upon being engaged by the suction cups, a product is pulled with the planar product part against (in this example, a planar front of) the plate 55.

As is further elucidated hereinbelow, the position of the plate 55 with respect to the suction cup units 51 is preferably adjustable, in particular at least in a direction parallel to the suction tube direction. As follows from the drawing, the plate 55 is, for example, a planar plate which is provided with a great multiplicity of openings, for example perforations or the like, in addition to the (suction cup) passage openings 56. As follows further from the drawing, a passage opening 56 can preferably be present at the location of a respective suction cup unit 51 (for instance, in such a manner that the suction cup unit 51 via that opening 56 can engage a product to be unstacked). Preferably, a passage opening 56 has a circumference (or perimeter) which is at least as great as (and in particular slightly greater than) the greatest circumference of a suction cup mouth of the respective suction cup unit 51.

In FIG. 1, more particularly, a general isometric view is shown in which the denester 1 comprises a housing 1a and a supply section 1b, this supply section 1b having the function of magazine with a transport track 1d for a stack 2 of products 2a, 2b, . . . and with two guide plates 1c on opposite sides of the stack (in the drawing only one of these plates 1c is represented). As schematically indicated, such a product 2a, 2b, . . . comprises projections 3 (for example nests of a tray for eggs or fruits) and planar parts 4 which, in forming such a stack, fit onto and into each other, thereby forming, in this case, a substantially rectangular block (in connection with a rectangular shape of the products 2a, 2b, . . . in this example).

Furthermore, there is shown a gripper 5 with a plate 55, which is configured for, on a side (hidden from view in the drawing) of the stack 2, in each case engaging a product 2a, 2b, . . . , taking it off, and conveying it to a position above a conveyor 100. From such a position, the engaging, in this case suction, can be stopped, so that the product ends up on this conveyor 100. In general, such a product 2a, 2b . . . will then fall down over a short distance before taking up its position on the conveyor 100. It is even possible to change suction to blowing, thereby avoiding products sticking or clinging, and concomitant delay. To one skilled in the art it will be clear that the gripper has a drive or the like which can move the gripper, for instance, among other possibilities, by at least a rotary movement, to a position where the plate 55 of the gripper 5 is substantially parallel to the conveyor 100.

In the isometric view according to FIG. 2 the gripper 5 with the above-mentioned plate 55 is represented in more detail, including at least a single suction cup unit 51 (in this FIGURE numbering a total of—in this example—four), each suction cup unit 51 including a suction mouth or suction cup mouth 52, a suction cup opening surface 53 of the suction cup mouth 52, and the suction cup unit 51 being connected to a suction tube 54. Further ducts to an air supply and/or discharge, for example a suction pump, referred to also as a suction source (with or without an optional blowing unit), are not shown.

In the example, the plate 55 and the at least one suction tube 54 are coupled to each other by means of a connecting structure/connecting means 57. In this FIG. 2 it is schematically indicated that the plate 55 for instance has a connecting element 57 with the suction tube 54, the connection preferably being such that a relative position and distance between a surface of the plate 55 (for instance, a product-receiving surface of the plate 55, facing the stack) and the suction cup opening surface 53 of the at least one suction cup unit 51 can be set (in particular in the perpendicular direction of the respective suction tube 54).

Further, in FIG. 2 a gripper framework 58 is drawn, by which the gripper 5 is connected with plate 55. More particularly, a gripper conveyor 59 is represented which can at least rotate so that a product 2a, 2b, . . . can be brought in the right position above the conveyor 100 mentioned.

The manner of application and utilization of the apparatus 1 shown in the drawings will be briefly described hereinafter, where necessary with reference to FIGS. 1 and 2. Where in this technical field it is customary to pick up, convey and then release light products such as packaging units with a system of suction cups or suction cup units 51, the present invention provides targeted support in the process by utilization of a plate 55. More particularly, upon pick-up, the product, at any rate at least a planar product part 4 thereof, is pulled against the plate by the apparatus.

With advantage, this is carried out by positioning the opening surfaces of the suction mouths 52 and the surface of the plate 55 (in particular a surface of the plate 55 facing the stack) parallel to each other, and furthermore by, during suction, moving the gripper 5 with these surfaces mentioned, substantially in perpendicular direction to an (opposite) planar product part 4 (of a frontmost product of the stack 2).

A further particular detail concerns the intermediate distance between the just-mentioned surfaces, that of the plate 55 and the suction cup opening surface 53, which can be optimally adjusted in proportion to the suction force. Given too great a distance, the suction force can be relatively great in order to position the product against the plate 55, and the other way around (i.e., given a relatively small intermediate distance, a relatively low suction force can be applied in order to position a product to be taken up, against the plate 55).

To one skilled in the art it will be clear that further details and particulars, such as suction force, choice of materials for the suction cup unit, positions of suction cup units and passage openings, size of passage openings, will correspondingly depend on the envisaged application.

To one skilled in the art it will be clear that the invention is not limited to the exemplary embodiments described. Various modifications of the exemplary embodiment of the present invention shown here are understood to fall within the scope of protection of the appended claims. For instance, the number of suction cups can vary depending on the shape and the type of packaging unit; furthermore, depending on the design and the construction, a different displacement and movement than the perpendicular one mentioned can be chosen.

The invention claimed is:

1. A method for unstacking preformed products from a stack thereof, which products have a planar surface, comprising the steps of:

placing an open mouth of a suction cup of a flexible material onto the planar surface of a product, wherein the suction cup extends through a passage opening in a planar plate, exerting a suction from a suction source through the suction cup onto the product, to pull the product against the planar plate, adjusting a position of the suction cup mouth relative to the planar plate in a direction perpendicular to the planar plate, conveying the planar plate with the product attached thereto to a delivery location and, releasing the product.

2. The method according to claim 1, wherein the exerted suction force is proportional to a distance between the planar plate and the open mouth of the suction cup when the suction cup engages the product.

3. The method according to claim 1, wherein the planar plate is arranged parallel to a plane of the suction cup mouth.

4. The method of claim 1, wherein the releasing step includes switching the suction cup from applying suction to blowing out.

5. The method according to claim 1, wherein the products comprise planar surfaces and indented surfaces which are nested into each other in the stack.

6. The method of claim 1, including a plurality of suction cups, each extending through a separate passage opening in the planar plate.

7. An apparatus for unstacking preformed products from a stack, which products have a planar surface comprising:

at least one suction assembly comprising a suction cup of flexible material and a suction tube connected to the suction cup, the suction assembly connected to a suction source, with the suction cup positioned to engage a single product of the stack at a planar surface thereof so as to apply a suction force to the single product through the suction cup and suction tube of the suction assembly, the suction cup including a mouth with an opening located in a plane which, upon engaging the single product of the stack, is substantially parallel to the planar plate, the suction cup of the suction assembly movable in a direction perpendicular to the plane of the suction cup mouth, and a planar plate operatively connected to the suction assembly, such that the suction cup is adjustable relative to the planar plate in a direction perpendicular to the planar plate, the planar plate having a passage opening for the suction assembly, the passage opening being substantially parallel to the plane of the suction cup mouth opening, wherein the passage opening has a circumference that is greater than the greatest circumference of the suction cup mouth, such that upon the application of suction through the suction assembly to the product, the product is pulled against the planar plate.

8. The apparatus according to claim 7 including a plurality of planar plate passages, each having a said suction assembly associated therewith.

* * * * *